US006646687B1

(12) United States Patent
Vlahos

(10) Patent No.: US 6,646,687 B1
(45) Date of Patent: Nov. 11, 2003

(54) AUTOMATIC BACKGROUND SCENE DEFOCUSING FOR IMAGE COMPOSITING

(75) Inventor: Paul Vlahos, Tarzana, CA (US)

(73) Assignee: Ultimatte Corporation, Chatsworth, CA (US)

( * ) Notice: Subject to any disclaimer, the term of this patent is extended or adjusted under 35 U.S.C. 154(b) by 0 days.

(21) Appl. No.: 09/293,746

(22) Filed: Apr. 16, 1999

(51) Int. Cl.[7] .......................... H04N 9/74; H04N 5/262; G09G 5/00
(52) U.S. Cl. ...................... 348/586; 348/587; 348/591; 348/590; 348/239; 345/640; 345/632
(58) Field of Search ................................. 348/586, 587, 348/591, 590, 239, 584; 345/680, 632, 640

(56) References Cited

U.S. PATENT DOCUMENTS

| 5,949,433 A | * | 9/1999 | Klotz ........................ 345/634 |
| 5,986,659 A | * | 11/1999 | Gallery et al. .............. 345/419 |
| 6,034,740 A | * | 3/2000 | Mitsui et al. ............... 348/587 |
| 6,122,013 A | * | 9/2000 | Tamir et al. ................ 348/587 |
| 6,271,890 B1 | * | 8/2001 | Tamir et al. ................ 348/587 |
| 2001/0036319 A1 | * | 11/2001 | Sakaida et al. ............. 382/232 |

OTHER PUBLICATIONS

Rotthaler, Jun. 27, 1996, Virtual Studio Technology, pp. 2, 5, and 6.*

* cited by examiner

Primary Examiner—Wendy R. Garber
Assistant Examiner—James Hannett
(74) Attorney, Agent, or Firm—Blakely, Sokoloff, Taylor & Zafman

(57) ABSTRACT

The present invention is a method and apparatus for automatically defocusing a background scene as the background scene is being composited with a foreground subject during the photography of the subject, where the background scene becomes increasingly defocused as the subject appears to approach the camera. A source of background image signals is connected to a background input of a compositing device capable of averaging a selected group of background pixels. A source of foreground image signals is connected to a foreground input of the compositing device. A matte signal generated by the compositing device is accessed and the matte signal is used to determine the ratio of foreground subject area to image frame area. The area ratio is then used to select, for each pixel in said background image, a number of adjacent pixels to be averaged to form an average pixel level. The signal levels at each pixel in the background scene are replaced with the average pixel level. This results in a defocusing of the background scene in proportion to the apparent reduction in camera to subject distance.

12 Claims, 5 Drawing Sheets

AUTOMATIC BACKGROUND SCENE DEFOCUSING FOR IMAGE COMPOSITING

BACKGROUND

The scene behind a sharply focused close-up of a subject will normally be unsharp, since this is the experience afforded by typical photographic lenses and the lens of the human eye. However, when the subject is at thirty feet or more, the background is expected to be in reasonably sharp focus.

Improvements in blue screen composite photography for removal of the blue backing, and improved techniques for detecting and scaling camera movements, has made practical the use of a virtual studio for live television broadcasting.

The virtual studio replaces backgrounds made of lumber, paint and wallpaper, with background scenes created by an artist or photographer. Being an image, the background does not change focus as the foreground camera focus follows the subject as it approaches or recedes from the camera. This lack of focus-change of the background, as the camera changes focus, has been one of the flaws in the virtual studio concept. This invention automatically defocuses the background image as the subject approaches the camera, thus simulating what would have occurred if the background had been real.

BRIEF SUMMARY OF THE INVENTION

An actor, when distant from the camera, occupies only a small area on the image frame. When the actor is close to the camera (as for a close-up), he fills a large part of the image frame. The ratio of subject area to image frame area is one of the criteria for estimating the extent of background defocus that should occur at various subject to camera distances.

The area of the subject is provided by the compositing matte signal. Adjustable ratio limits are set to initiate and terminate the defocus being generated. The defocus and refocus rate is controlled when an actor enters or leaves the frame when near the camera.

DETAILED DESCRIPTION

Every compositing device or software compositing program generates a matte signal, also called a key signal or alpha channel. The matte signal is a silhouette of the subject and therefore occupies the same image frame area as the subject. For example, in compositing devices available from Ultimatte Corporation, the matte signal is zero in the opaque subject area. The ratio of the number of matte pixels having a matte level of zero, compared to the number of pixels in the image frame, is the percentage of the image frame occupied by the subject. As the subject to camera distance decreases, or appears to decrease, the subject occupies a larger portion of the image frame. The subject to camera distance can be made to appear to change by changing the lens focal length of a zoom lens.

Figure 1:
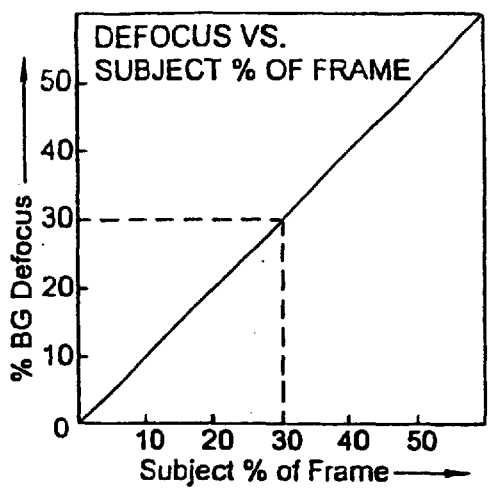
FIG. 1 is a graph showing the amount of defocus as a function of the % of image frame occupied by a subject. The amount of defocus is represented as a percentage of the highest possible defocus, which is taken to be the overall average of all the pixels (colors) in the frame.

The x-axis of FIG. 1 shows the % of image frame occupied by the subject (subject size) and the y-axis shows an increasing amount of defocus of a background as the subject size increases. FIG. 1 shows the background just beginning to lose focus when the subject is just a speck in the distance occupying no significant frame area.

Figure 2:
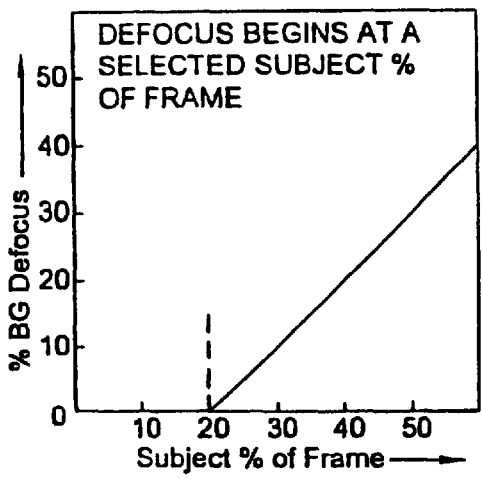
FIG. 2 is a graph showing a range of ratios of image area to frame area an operator may select for defocus to begin.

Since all lenses have a depth of field, background defocusing should not start until the subject is closer than the foreground lens hyperfocal distance. This distance, for example, is 50 feet for a 50 mm lens at f/4.0. Since the determination of sharp focus is subjective, the defocus starting point is also subjective and depends upon the scene and the judgement of the operator. In FIG. 2, a subject size of 20% is selected as the minimum subject size that will begin to defocus the background.

Figure 3:
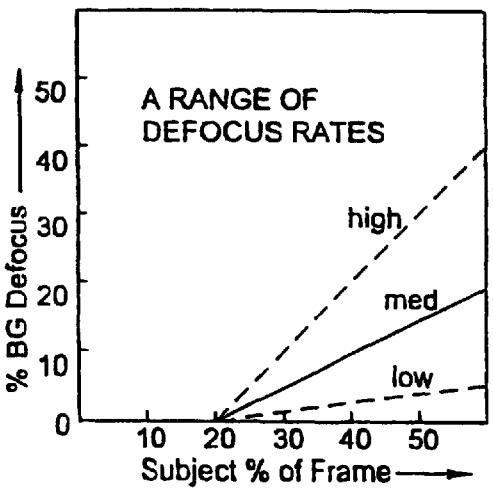
FIG. 3 is a graph illustrating a range of defocus rates an operator may select.

Having selected a suitable defocus starting point, the operator then selects a defocus rate, i.e. how much to defocus the background for a given incremental increase in the subject size. FIG. 3 illustrates a range of defocus rates with the solid line indicating a rate selected by the operator.

Figure 4:
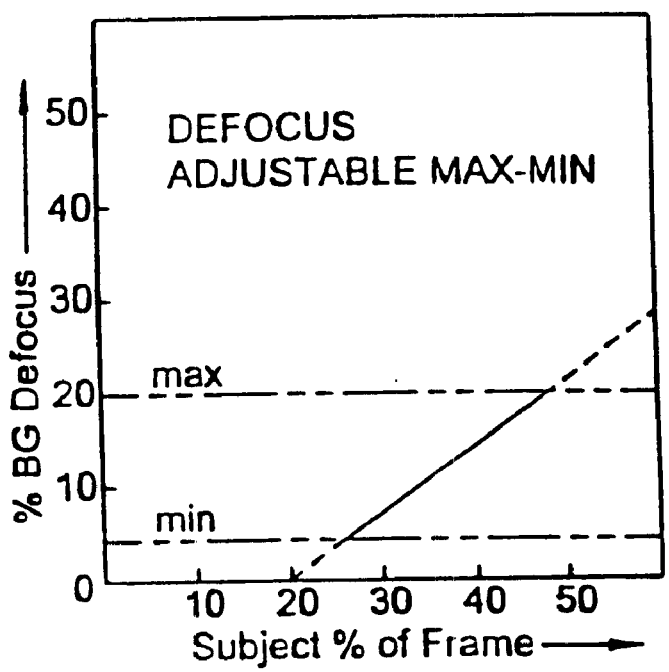
FIG. 4 illustrates a range over which an operator may select maximum and minimum defocus limits.
Figure 5:
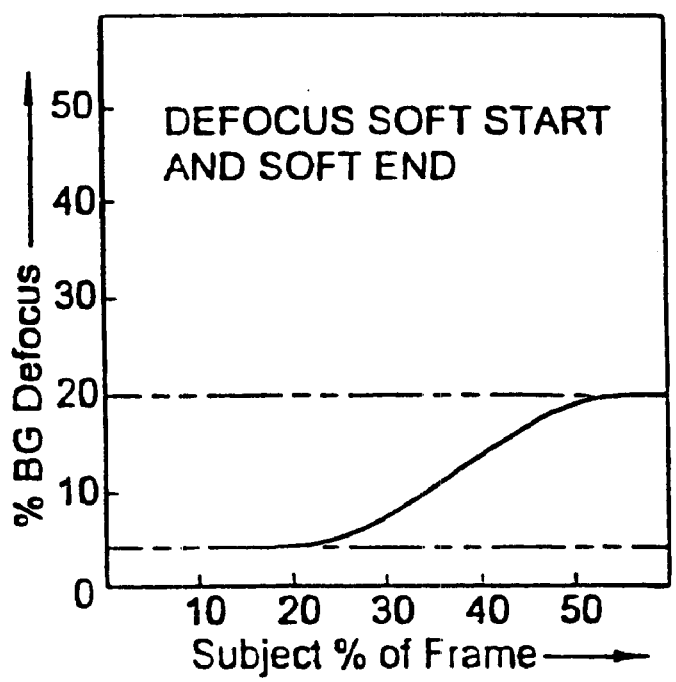
FIG. 5 illustrates a gradual initiation and termination of defocus between selected maximum and minimum limits.

Once the background has been defocused a substantial amount, there is no need to continue defocusing. It may be desirable to limit defocus to a rather modest amount since the background does not want to be so defocused as to become unrecognizable. The maximum amount of defocus may be limited by operator selection. A medium limit has been selected as shown in FIG. 4. FIG. 4 also shows a selected minimum defocus limit that is useful when focus is not to be returned to a distant background. Lens focus does not begin to change abruptly therefore it would be more realistic if the focus rate of change was a little nonlinear as shown in FIG. 5.

To be a practical system, the automatic defocus function should not be easily fooled, and it should require a minimum of operator attention. For example, what happens when an actor walks out of the scene on either side of the image frame when he is close to the camera? Most likely the camera will remain focused on the actor as he leaves the scene.

Being close to the camera, the actor will fill a large percentage of the image frame, but as he walks out of the scene this percentage shrinks to zero. As the % of image area occupied by the subject is being reduced to zero, the defocus logic would normally return the background to sharp focus even though the camera lens is not changing its focus. To prevent changing background defocus, the logic of the system freezes the background defocus at its current setting when the subject first touches the left or right edge of the frame. One could extend this edge touching logic to include the top and bottom frame edges, but when the subjects are people, the left and right edges are preferred.

When the subject clears the image frame the background defocus freeze is released over a time span of a few seconds to simulate the actions of a camera operator changing camera focus.

When a subject enters the image frame near the camera, his exact distance from the camera may not be known. It can be assumed that the camera focus will be shifted to the actor, which should cause a simultaneous defocus of the background. The typical rate of focus change by an operator is approximated by the rate of defocus change by the defocus logic.

The maximum rate at which defocus/refocus can occur is limited to a selected rate that simulates the rate at which an operator would change camera focus. Therefore the sudden entry of an object into the image frame does not fool the defocus logic into a sudden change in background focus.

The technology for defocusing an image is well known in image processing. A simple means to defocus an image is to substitute, for each pixel in the background, an average of the RGB levels of a small group of adjacent pixels. A weighted pixel average, where the weighting is quite small as defocus begins, and increases as a greater number of pixels is averaged, provides a very smooth and stepless defocus effect at the lower end of the curve in FIG. 5. The changing slope at the upper end of FIG. 5 may be achieved by making smaller increases in the number of pixels averaged as defocus nears its selected maximum.

Provisions are made for freezing (locking) operator settings for each of the controlled parameters. Such fixed settings allow the operator to establish a fixed amount of defocus that may remain during a broadcast segment. The operator may also, at any time, freeze the defocus function at its current state, or shut off the defocus function to return to a sharply focused background.

It is not an objective to simulate any given lens and f-stop, but rather to generate a range of defocus that past experience by persons skilled in the field of the invention would be led to expect. With the controls provided, the operator has all the necessary flexibility to adjust parameters that produce a background that softens as one might expect when the actor approaches the camera, and does it automatically. Default settings for each of the parameters described above are accessed when the defocus function is first selected. These default settings are based upon Ultimatte's experience, but may be reset to other values.

A change in camera focus also causes minor changes in image size. Changes in image size introduce tracking errors between the camera moves and the opposite moves of the background scene. It has been a practice in a virtual studio environment to raise the light level and stop down the camera lens so as to achieve a large depth of field, thereby avoiding the need to change camera focus.

Even if one attached sensors to the camera lens focus ring to detect focus changes, and used such changes to defocus the background, their purpose would be largely defeated by the large depth of field. The use of subject % of frame might well be used even if the camera lens was equipped with camera lens focus sensors.

Figure 6:
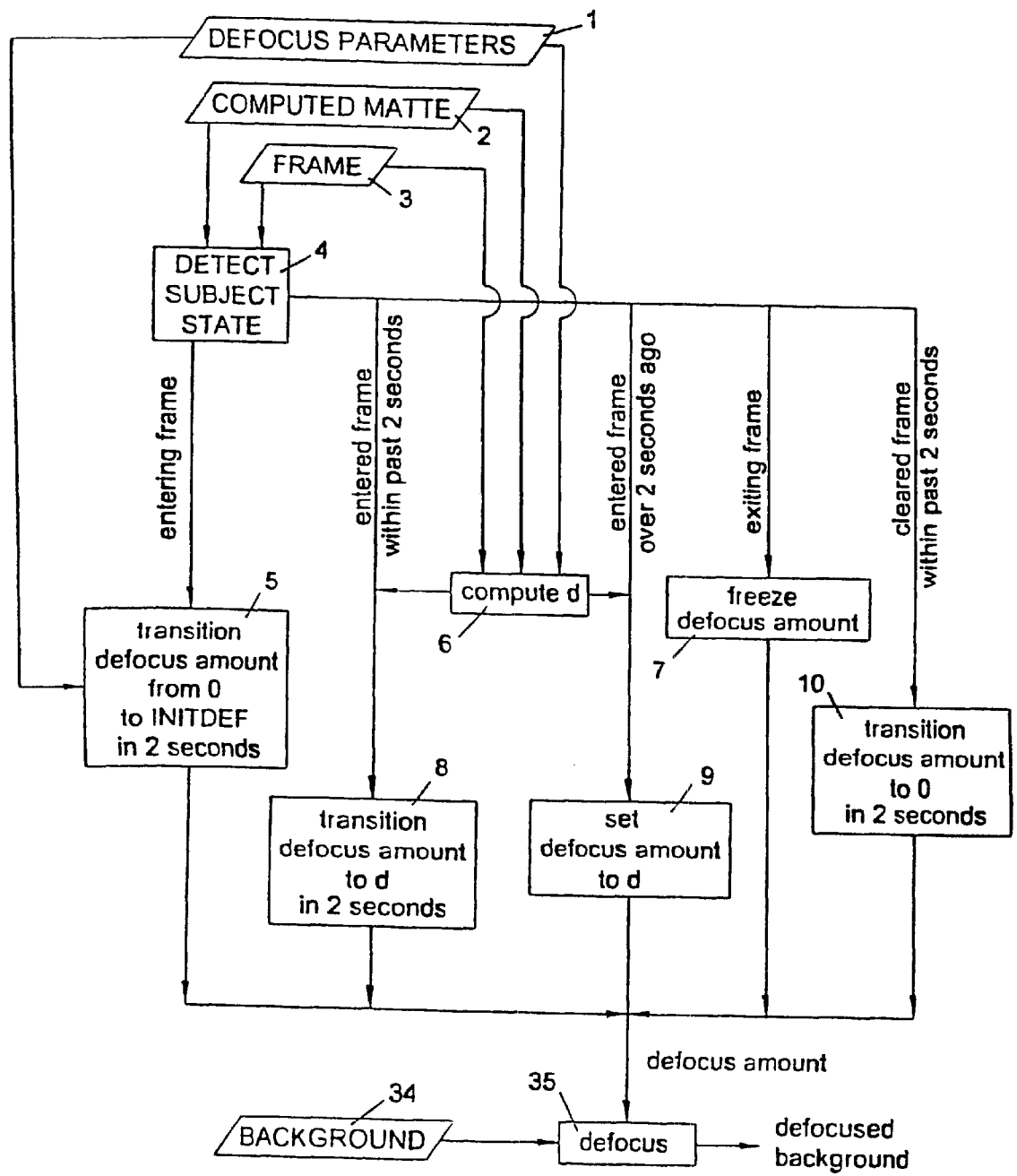
FIG. 6 is a block diagram of one implementation of the proposed automatic background defocusing.

FIG. 6 is a block diagram of one implementation of the proposed automatic background defocusing. The state of the subject position with respect to the frame is determined (block 4), from the computed matte (block 2) and the frame (block 3). The defocus parameters (block 1) are as follows:

INITDEF—initial defocus amount. A preset amount of defocus used when subject first enters.
MINSIZE—the ratio of subject area to frame area at which defocusing begins.
RATE—the rate of change in defocus amount corresponding to change in % of image frame occupied by the subject.
MINDEF—minimum defocus amount. The lowest amount of defocus permitted. MINDEF is typically initialized to INITDEF.
MIN2DEF—secondary preset defocus amount. MINDEF is reset to MIN2DEF when the defocus amount surpasses MIN2DEF, preventing returnmto a lower defocus amount.
MAXDEF—the maximum defocus amount permitted If the subject is determined to be entering the frame, the defocus amount is gradually (within 2 seconds) shifted (block 5) from zero to INITDEF, a preset value. If the subject has entered the frame within the past 2 seconds, the defocus amount is gradually shifted (block 8) to d, the output of block 6. If the subject has entered the frame over 2 seconds ago, the defocus amount is set (block 9) to d, the output of block 6. If the subject is exiting the frame, the defocus amount is frozen (block 7). Finally, if the subject has cleared the frame within the past 2 seconds, the defocus amount is gradually shifted (block 10) to zero. In any case, the new background (block 34) is then defocused (block 35) by the defocus amount.

Figure 7:
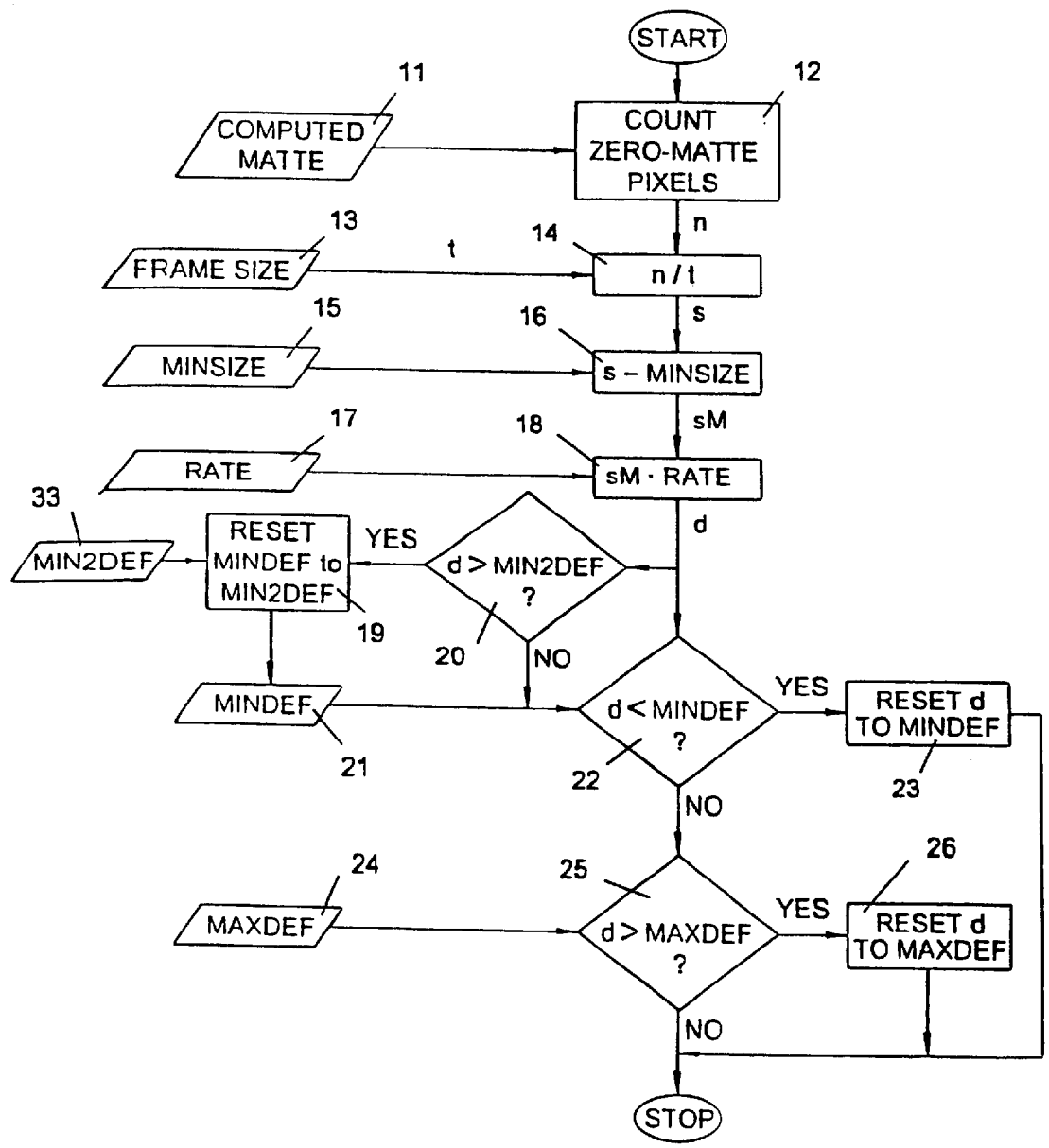
FIG. 7 shows the detail of "compute d" block of FIG. 6.

FIG. 7 shows the detail of the "compute d" block of FIG. 6. This block takes the defocusing parameters (block 1 of FIG. 6), the computed matte, and the size of the frame (total number of pixels) to compute a tentative "defocus amount" d, which will either be used directly or blend with other preset or operator set values, as described in FIG. 6. The number n of pixels for which the matte (block 11) is zero are counted (block 12) and divided (block 14) by the total number t of pixels in the frame (block 13). This ratio estimates the relative size s of the subject, from which MINSIZE, the minimum size for defocusing (block 15), is then subtracted (block 16) to produce an adjusted size sM. sM is then multiplied (block 18) by the RATE parameter (block 17), to produce a tentative defocus amount d. Optionally, if d is greater than (block 20) a secondary minimal defocus amount MIN2DEF (block 33), the primary defocus amount MINDEF (block 21)—initially set to INITDEF—is reset (block 19) to MIN2DEF. This allows the defocusing to proceed from a low value (0 or INITDEF), but optionally prevents a later return to a low value. At this point d (from block 18) is compared to (block 22) MINDEF (block 21). If d is less than MINDEF, it is reset to MINDEF. Otherwise, d is compared to (block 25) MAXDEF (block 24), the maximum amount of defocus permitted. If d is greater than MAXDEF, it is reset to MAXDEF. This concludes the computation of d. In block 18, an alternative, non-linear defocus amount can be computed using a look-up table (LUT) and replacing the product sM*RATE by the formula MAXDEF*LUT[sM*RATE/MAXDEF]. The LUT is set up to map discrete values between 0.0 and 1.0 into discrete values between 0.0 and 1.0. As used in the formula above, it is independent of the defocusing parameters.

Figure 8:
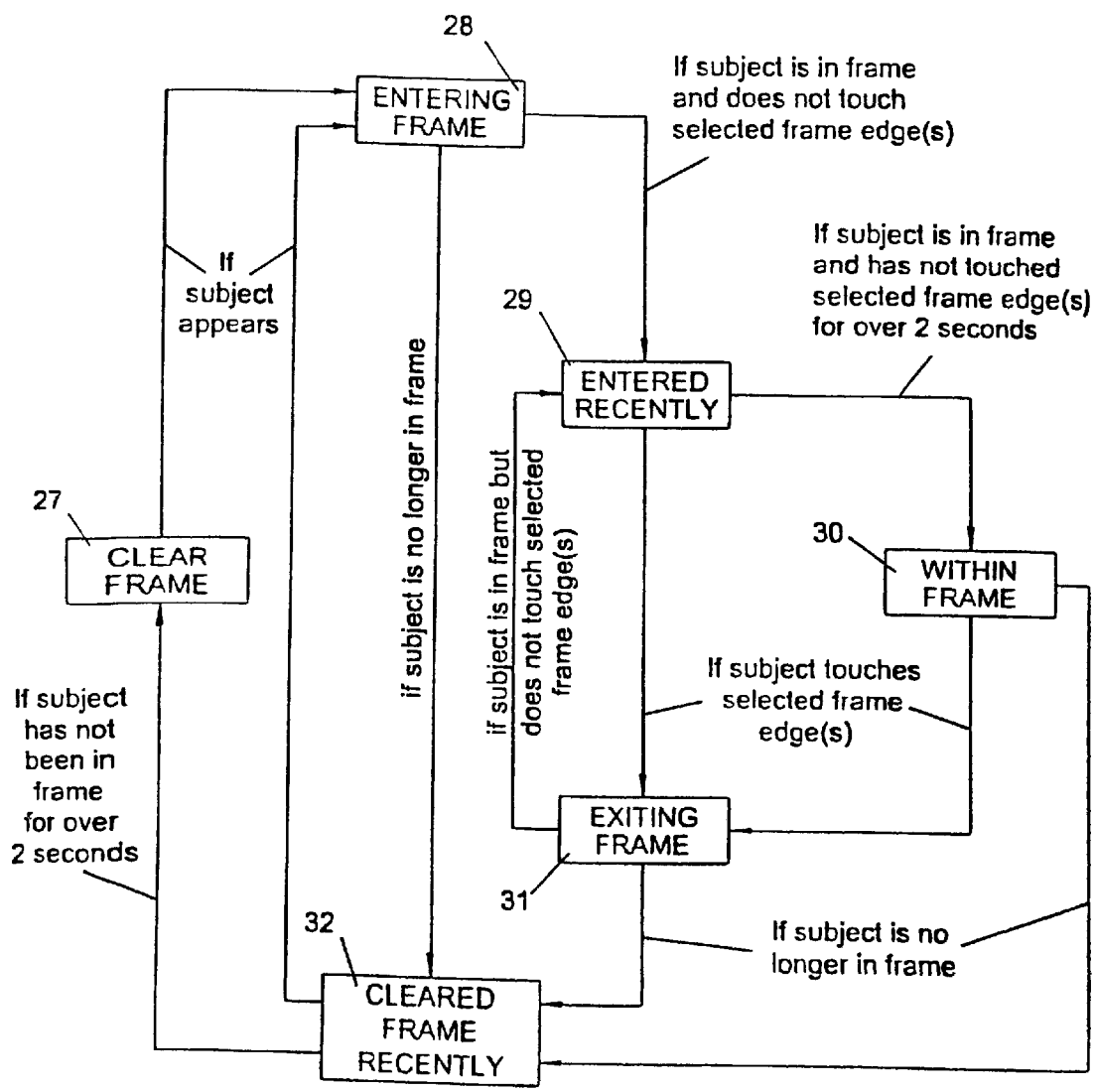
FIG. 8 is a state transition graph of the "DETECT SUBJECT STATE" block of FIG. 6.

FIG. 8 is a state transition graph of the "DETECT SUBJECT STATE" block of FIG. 6: In this figure, the subject is said to "touch selected frame edge(s)" (left, right, tip, and/or bottom) if there are pixels with a matte level of zero at or adjacent to a selected frame edge. The subject is said to "appear" if there are any zero-matte pixels in the frame. The state transitions illustrated are as follows:

If the system is in the "CLEAR FRAME" state (block 27), an appearance of a subject (a zero-matte region) causes a transition to the "ENTERING FRAME" state (block 28).

If the system is in the "ENTERING FRAME" state (block 28), and the subject is in the frame but does not touch selected frame edge(s), the state transitions to the "ENTERED RECENTLY" state (block 29).

If the system is in the "ENTERING FRAME" state (block 28), and the subject is no longer in the frame, the state transitions to the "CLEARED FRAME RECENTLY" state (block 32).

If the system is in the "ENTERED RECENTLY" state (block 29), and the subject is in the frame but has not touched selected frame edge(s) for over 2 seconds, the state transitions to the "WITHIN FRAME" state (block 30).

If the system is in the "ENTERED RECENTLY" state (block 29) and the subject touches selected frame edge(s), the state transitions to the "EXITING FRAME" state (block 31).

If the system is in the "WITHIN FRAME" state (block 30), and the subject touches selected frame edge(s), the state transitions to the "EXITING FRAME" state (block 31).

If the system is in the "WITHIN FRAME" state (block 30), and the subject is no longer in the frame, the state transitions to the "CLEARED FRAME RECENTLY" state (block 32).

If the system is in the "EXITING FRAME" state (block 31), and the subject is no longer in the frame, the state transitions to the "CLEARED FRAME RECENTLY-" state (block 32).

If the system is in the "EXITING FRAME" state (block 31), and the subject is in the frame but does not touch selected frame edge(s), the state transitions to the "ENTERED RECENTLY" state (block 29).

If the system is in the "CLEARED FRAME RECENTLY" state (block 32) and the subject has not been in the frame for over 2 seconds, the state transitions to the "CLEAR FRAME" state (block 27).

If the system is in the "CLEARED FRAME RECENTLY" state (block 32) and the subject appears, the state transitions to the "ENTERING FRAME" state (block 28).

What is claimed is:

1. A method for automatically defocusing a background scene including background pixels as said background scene is being composited with a foreground subject during the photography of said subject and where said background scene becomes increasingly defocused as said subject appears to approach the camera, and comprises the steps of;
   a) connecting a source of background image signals to the background input of a compositing device capable of averaging a selected group of background pixels, each of said background pixels having a signal level,
   b) connecting a source of foreground image signals to a foreground input of the compositing device,
   c) accessing a matte signal generated by said compositing device,
   d) using said matte signal to determine the ratio of foreground subject area to image frame area,
   e) using said area ratio to select, for each pixel in said background image, a number of adjacent pixels to be averaged to form an average pixel level
   f) replacing said signal level of said background pixels with said average pixel level, thereby defocusing said background scene in proportion to the apparent reduction in camera to subject distance.

2. The method of claim 1 in which the ratio of subject area to image frame area at which defocus begins is greater than a selected minimum of said ratio.

3. The method of claim 1 in which the rate of defocus change, for a given rate of change in subject area, is selectively determined.

4. The method of claim 1 in which the number of pixels selected for averaging determines the amount of defocus.

5. The method of claim 3 in which the selected defocus rate is made nonlinear.

6. The method of claim 1 in which a given state of defocus is automatically frozen when a subject moves to touch selected edges of the image frame.

7. The method of claim 6 in which defocus is returned to sharp focus over a timed period when the subject has cleared the image frame.

8. The method of claim 1 in which the background is defocused over a timed period when a subject enters into the image frame from outside selected image edges.

9. The method of claim 1 in which the amount of background defocus decreases as the camera to subject distance appears to increase.

10. A method for automatically defocusing a video background scene behind a subject, in real time, by defocusing said background scene in proportion to a percent of image frame area occupied by said subject, using a ratio of subject area to background scene area to select for each pixel in the background scene area, a number of adjacent pixels to form an average pixel level.

11. The method of claim 1 wherein, the number of pixels selected for averaging cannot exceed a selected maximum.

12. An apparatus for automatically defocusing a background scene including background pixels, each having a signal level as said background scene is being composited with a foreground subject during the photography of said subject and where said background scene becomes increasingly defocused as said subject appears to approach the camera comprising:
   a compositing device having a foreground input for receiving foreground image signals and a background input for receiving background image signals, said device capable of averaging a selected group of background pixels from a received background image signal and generating a matte signal, said device adapted to use said matte signal to determine the ratio of foreground subject area to image frame area, and the determined area ratio to select, for each pixel in said background image, a number of adjacent pixels to be averaged to form an average pixel level, said device further operating to replace said signal levels at each pixel in said background scene with said average pixel level to defocus said background scene in proportion to the apparent reduction in camera to subject distance.

* * * * *